US012755694B2

(12) United States Patent
Youn et al.

(10) Patent No.: US 12,755,694 B2
(45) Date of Patent: Oct. 6, 2026

(54) PIXEL CIRCUIT AND DISPLAY DEVICE INCLUDING SAME

(71) Applicant: LG Display Co., Ltd., Seoul (KR)

(72) Inventors: Jun Ho Youn, Paju-si (KR); Do Yeong Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/887,924

(22) Filed: Sep. 17, 2024

(65) Prior Publication Data

US 2025/0218363 A1 Jul. 3, 2025

(30) Foreign Application Priority Data

Dec. 29, 2023 (KR) ........................ 10-2023-0197814

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/0426* (2013.01); *G09G 2310/08* (2013.01); *G09G 2320/0233* (2013.01); *G09G 2330/023* (2013.01)

(58) Field of Classification Search
CPC .. G09G 3/3233; G09G 3/3266; G09G 3/3291; G09G 2300/0426; G09G 2310/08; G09G 2320/0233; G09G 2330/023; G09G 2300/0804; G09G 2300/0814; G09G 2300/0842; G09G 2310/0262; G09G 3/3225; G09G 3/2003; G09G 2320/02; G09G 2330/021
See application file for complete search history.

(56) References Cited

U.S. PATENT DOCUMENTS

| | | | | |
|---|---|---|---|---|
| 8,654,050 | B2 * | 2/2014 | Ueki | G09G 3/3607 345/614 |
| 10,409,118 | B1 * | 9/2019 | Chang | G02F 1/134363 |
| 12,096,669 | B2 * | 9/2024 | Hack | H10K 50/813 |

(Continued)

FOREIGN PATENT DOCUMENTS

| | | |
|---|---|---|
| KR | 10-2020-0083866 A | 7/2020 |
| KR | 10-2021-0106335 A | 8/2021 |
| KR | 10-2023-0102838 A | 7/2023 |

*Primary Examiner* — Jose R Soto Lopez
(74) *Attorney, Agent, or Firm* — Birch, Stewart, Kolasch & Birch, LLP

(57) ABSTRACT

A pixel circuit for a display device can include a driving element including a first electrode connected to a first power line, a gate electrode connected to a first node, and a second electrode connected to a second node, a switch element configured to supply a data voltage to the first node in response to a gate signal, a capacitor connected between the first node and the second node, and a first light-emitting element and a second light-emitting element connected in parallel between the second node and a second power line. Also, a first threshold voltage of the first light-emitting element can be different than a second threshold voltage of the second light-emitting element, or a switch can be connected between first light-emitting element and a second light-emitting element.

4 Claims, 11 Drawing Sheets

(56) References Cited

U.S. PATENT DOCUMENTS

| | | | | |
|---|---|---|---|---|
| 2005/0248516 | A1* | 11/2005 | Li | G09G 3/3233 345/82 |
| 2008/0238328 | A1* | 10/2008 | Shin | G09G 3/2022 315/169.3 |
| 2008/0308819 | A1* | 12/2008 | Louwsma | H10K 59/38 257/E33.012 |
| 2009/0315874 | A1* | 12/2009 | Kim | G09G 3/3233 345/82 |
| 2011/0050743 | A1* | 3/2011 | Park | G09G 3/3666 345/690 |
| 2011/0291115 | A1* | 12/2011 | Kim | G09G 3/3225 257/E33.055 |
| 2012/0081419 | A1* | 4/2012 | Abe | G09G 3/3426 345/691 |
| 2015/0001540 | A1* | 1/2015 | Chang | G09G 3/20 257/59 |
| 2015/0145907 | A1* | 5/2015 | Ryu | G09G 3/3233 345/697 |
| 2015/0255012 | A1* | 9/2015 | Gu | G09G 3/2003 345/83 |
| 2016/0012779 | A1* | 1/2016 | Gu | G09G 3/3233 345/215 |
| 2016/0086547 | A1* | 3/2016 | Lebrun | G09G 3/3233 345/205 |
| 2016/0171941 | A1* | 6/2016 | Shiomi | G02F 1/136286 345/694 |
| 2016/0260781 | A1* | 9/2016 | Yang | G09G 3/3233 |
| 2017/0069244 | A1* | 3/2017 | Lim | G09G 3/2003 |
| 2017/0162111 | A1* | 6/2017 | Kang | G09G 3/3225 |
| 2017/0345376 | A1* | 11/2017 | Tani | G09G 3/3233 |
| 2017/0358257 | A1* | 12/2017 | Lin | G09G 3/32 |
| 2018/0019377 | A1* | 1/2018 | Kim | H10H 20/01335 |
| 2018/0190193 | A1* | 7/2018 | Kim | G09G 3/3216 |
| 2019/0035333 | A1* | 1/2019 | Chen | G09G 3/3241 |
| 2019/0131352 | A1* | 5/2019 | Choi | G09G 3/3291 |
| 2019/0325823 | A1* | 10/2019 | Yang | G09G 3/3233 |
| 2020/0243003 | A1* | 7/2020 | Yang | G09G 3/3233 |
| 2020/0380920 | A1* | 12/2020 | Lee | G09G 3/3233 |
| 2020/0403059 | A1* | 12/2020 | Oh | G09G 3/3233 |
| 2021/0097929 | A1* | 4/2021 | Li | G09G 3/2003 |
| 2021/0201831 | A1* | 7/2021 | Woo | G09G 3/3291 |
| 2021/0359009 | A1* | 11/2021 | Lee | H10K 59/353 |
| 2021/0366372 | A1* | 11/2021 | Sun | G09G 5/10 |
| 2021/0390906 | A1* | 12/2021 | Pyun | G09G 3/3291 |
| 2022/0059032 | A1* | 2/2022 | Kang | G09G 3/3291 |
| 2022/0181419 | A1* | 6/2022 | Qian | G09G 3/3208 |
| 2022/0189403 | A1* | 6/2022 | Kang | G09G 3/3258 |
| 2022/0199018 | A1* | 6/2022 | Jeon | G09G 3/3233 |
| 2022/0278185 | A1* | 9/2022 | Hack | G09G 3/32 |
| 2022/0293052 | A1* | 9/2022 | Lee | G09G 3/2003 |
| 2023/0014815 | A1* | 1/2023 | Lee | G09G 3/006 |
| 2023/0018404 | A1* | 1/2023 | Zen | G09G 3/3208 |
| 2023/0035054 | A1* | 2/2023 | Koo | G09G 3/3233 |
| 2023/0091644 | A1* | 3/2023 | Charisoulis | G09G 3/2074 345/694 |
| 2023/0134894 | A1* | 5/2023 | Hamer | G02F 1/39 257/40 |
| 2023/0197005 | A1* | 6/2023 | Kim | G09G 3/2014 345/214 |
| 2023/0206835 | A1* | 6/2023 | Son | H10K 59/131 345/698 |
| 2023/0209883 | A1* | 6/2023 | Ji | G06F 3/0412 345/174 |
| 2023/0217710 | A1* | 7/2023 | Jinta | G09G 3/3233 257/40 |
| 2023/0267874 | A1* | 8/2023 | Hsu | G09G 3/2003 345/55 |
| 2023/0402579 | A1* | 12/2023 | Cheon | G09G 3/3233 |
| 2024/0005855 | A1* | 1/2024 | Chi | G09G 3/32 |
| 2024/0071298 | A1* | 2/2024 | Huang | G09G 3/32 |
| 2024/0087524 | A1* | 3/2024 | Xu | G09G 3/3233 |
| 2024/0144874 | A1* | 5/2024 | Wang | G09G 3/32 |
| 2024/0161674 | A1* | 5/2024 | Choi | G09G 3/2003 |
| 2024/0257746 | A1* | 8/2024 | Jang | G09G 3/3233 |
| 2025/0363951 | A1* | 11/2025 | Liao | G09G 3/3258 |

* cited by examiner

PIXEL CIRCUIT AND DISPLAY DEVICE INCLUDING SAME

CROSS-REFERENCE TO RELATED APPLICATION

This application claims priority to and the benefit of Korean Patent Application No. 10-2023-0197814, filed in the Republic of Korea, on Dec. 29, 2023, the entirety of which is incorporated herein by reference into the present application.

BACKGROUND

1. Field

The present disclosure relates to a pixel circuit and a display device including the same.

2. Discussion of Related Art

Display devices includes a liquid crystal display (LCD) device, an electroluminescence display device, a field emission display (FED) device, a plasma display panel (PDP), and the like.

Electroluminescent display devices can be categorized into inorganic light emitting display devices and organic light emitting display devices according to a material of a light emitting layer. An active-matrix type organic light emitting display device includes an organic light emitting diode (hereinafter referred to as an "OLED") which emits light by itself (e.g., no backlight unit), and has advantages in that a response speed is fast and luminous efficiency, luminance, and a viewing angle are large.

Some types of display devices, for example, a liquid crystal display device or an organic light emitting display device include a display panel including a plurality of sub-pixels, a driver outputting a driving signal for driving the display panel, a power supply generating power to be supplied to the display panel or the driver, and the like. The driver includes a gate driver that supplies a gate signal, such as a scan signal and emission signal to the display panel, and a data driver that supplies a data signal to the display panel.

In order to improve various characteristics of sub-pixels having a certain color, one sub-pixel can be composed of two sub-pixels circuits and two light emission areas. However, driving circuits for individually driving two light-emitting elements, and separate pixel data and wires for each driving circuit can cause the circuit to become relatively complicated.

Thus, a need exists for sub-pixel configuration that can have a smaller footprint, provide a finer granularity of luminance control for both low grayscale data and high grayscale data, extend the lifespan of the sub-pixel, and improve image quality.

SUMMARY OF THE DISCLOSURE

The present disclosure is directed to solving all the above-described necessity and problems.

The present disclosure provides a pixel circuit having a structure that saves space and reduces wiring and a display device including the same.

It should be noted that objects of the present disclosure are not limited to the above-described objects, and other objects of the present disclosure will be apparent to those skilled in the art from the following descriptions.

A pixel circuit according to embodiments of the present disclosure can include a driving element including a first electrode connected to a first power line, a gate electrode connected to a first node, and a second electrode connected to a second node, a switch element configured to supply a data voltage to the first node in response to a gate signal, a capacitor connected between the first node and the second node, and a first light-emitting element and a second light-emitting element connected in parallel between the second node and a second power line, in which the first light-emitting element and the second light-emitting element have different threshold voltages.

A pixel circuit according to embodiments of the present disclosure can include a driving element including a first electrode connected to a first power line, a gate electrode connected to a first node, and a second electrode connected to a second node, a first switch element configured to supply a data voltage to the first node in response to a gate signal, a capacitor connected between the first node and the second node, a first light-emitting element and a second light-emitting element connected in parallel between the second node and a second power line, and a second switch element configured to selectively connect the second node to the second light-emitting element in response to a control signal.

A display device according to embodiments of the present disclosure can include a display panel in which a plurality of data lines, a plurality of gate lines intersecting the data lines, and a plurality of pixel circuits are arranged, in which each of the plurality of pixel circuits includes: a driving element including a first electrode connected to a first power line, a gate electrode connected to a first node, and a second electrode connected to a second node, a switch element configured to supply a data voltage to the first node in response to a gate signal, a capacitor connected between the first node and the second node, and a first light-emitting element and a second light-emitting element connected in parallel between the second node and a second power line, in which the first light-emitting element and the second light-emitting element have different threshold voltages.

A display device according to embodiments of the present disclosure can include a display panel in which a plurality of data lines, a plurality of gate lines intersecting the data lines, and a plurality of pixel circuits are arranged, a data driver configured to apply a data voltage to the data lines, a gate driver configured to apply a gate signal to the gate lines, and a timing controller configured to control the data driver and the gate driver, in which each of the plurality of pixel circuits includes a driving element including a first electrode connected to a first power line, a gate electrode connected to a first node, and a second electrode connected to a second node, a first switch element configured to supply a data voltage to the first node in response to a gate signal, a capacitor connected between the first node and the second node, a first light-emitting element and a second light-emitting element connected in parallel between the second node and a second power line, and a second switch element configured to selectively connect the second node to the second light-emitting element in response to a control signal.

According to embodiments of the present disclosure, two light-emitting elements having different threshold voltages can be connected in parallel to allow one light-emitting element or both light-emitting elements to emit light based on the voltage level of the data voltage, thereby ensuring luminance uniformity at a low grayscale.

According to embodiments of the present disclosure, the driving of two light-emitting elements can be controlled by adding one switch element, so that it can be free to determine whether or not to operate the pixel.

According to embodiments of the present disclosure, the stack structures of two identical light-emitting elements are formed adjacent to each other, but the anode electrodes are separated by a switch, so that a phenomenon of emitting light due to a leakage current can be reduced.

According to embodiments of the present disclosure, the anode electrodes of the light-emitting elements composed of the same fine metal mask (FMM) are separated by a switch, so that it can be possible to design freely from the FMM alignment problem.

According to embodiments of the present disclosure, power consumption can be reduced since the circuit configuration has a compact design.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1:
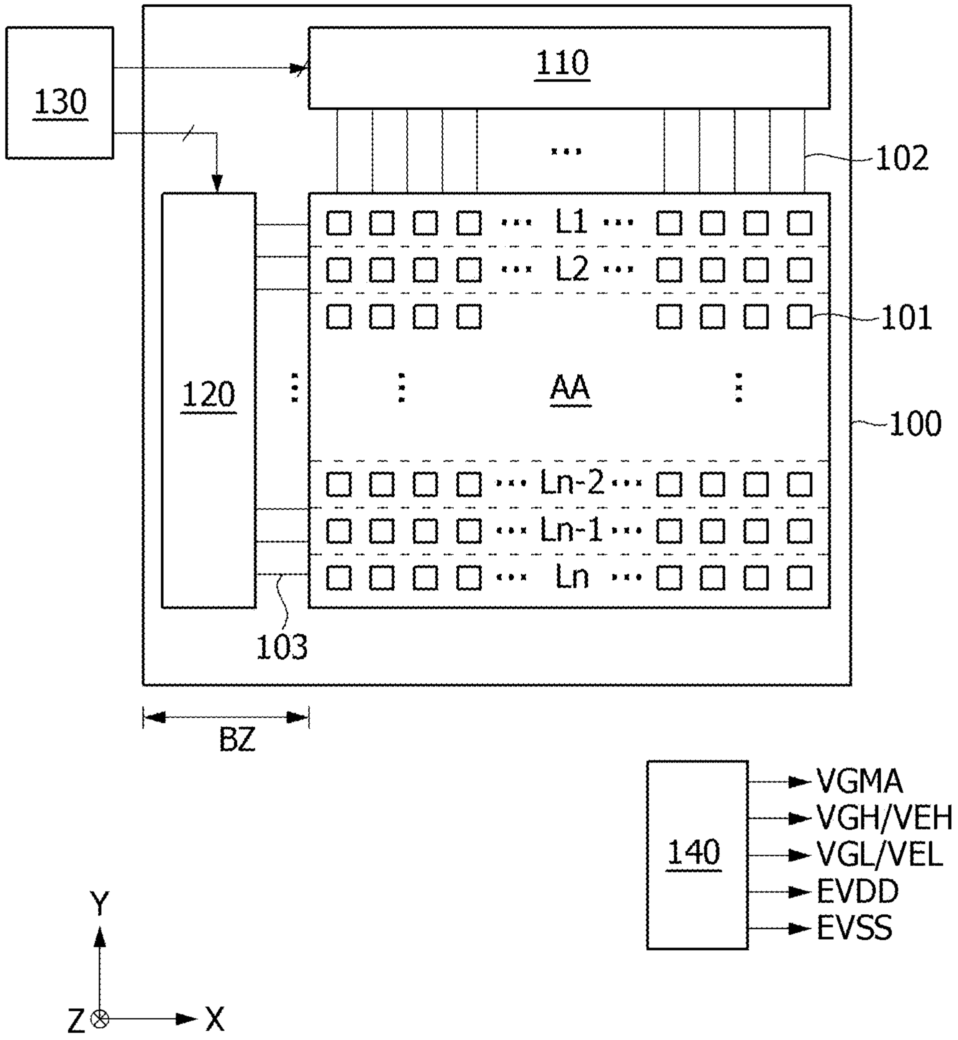
FIG. 1 is a block diagram illustrating a display device according to an embodiment of the present disclosure.

Advantages and features of the present specification and methods of achieving them will become apparent with reference to preferable embodiments, which are described in detail, in conjunction with the accompanying drawings. However, the present specification is not limited to the embodiments to be described below and can be implemented in different forms, the embodiments are only provided to completely disclose the present disclosure and completely convey the scope of the present disclosure to those skilled in the art, and the present specification is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology can unnecessarily obscure the gist of the present disclosure, the detailed description thereof will be omitted.

When “including,” “having,” “consisting,” and the like mentioned in the present specification are used, other parts can be added unless “only” is used. A situation in which a component is expressed in a singular form includes a plural form unless explicitly stated otherwise.

In interpreting the components, it should be understood that an error range is included even when there is no separate explicit description.

In the situation of a description of a positional relationship, for example, when the positional relationship of two parts is described as “on,” “at an upper portion,” “at a lower portion,” “next to,” and the like, one or more other parts can be located between the two parts unless “immediately” or “directly” is used. Also, the term “can” includes all meanings and definitions of the term “may.”

Although first, second, and the like are used to describe various components, these components are not limited by these terms. These terms are only used to distinguish one component from another. Accordingly, a first component, which is mentioned, below can also be a second component within the technical spirit of the present disclosure.

The same reference numerals can refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In a display device of the present disclosure, the pixel circuit and the gate driving circuit can include a plurality of transistors. Transistors can be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS), since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the situation of the n-channel transistor, a gate-on voltage can be a gate high voltage, and a gate-off voltage can be a gate low voltage. In the case of the p-channel transistor, a gate-on voltage can be a gate low voltage, and a gate-off voltage can be a gate high voltage.

Figure 2:
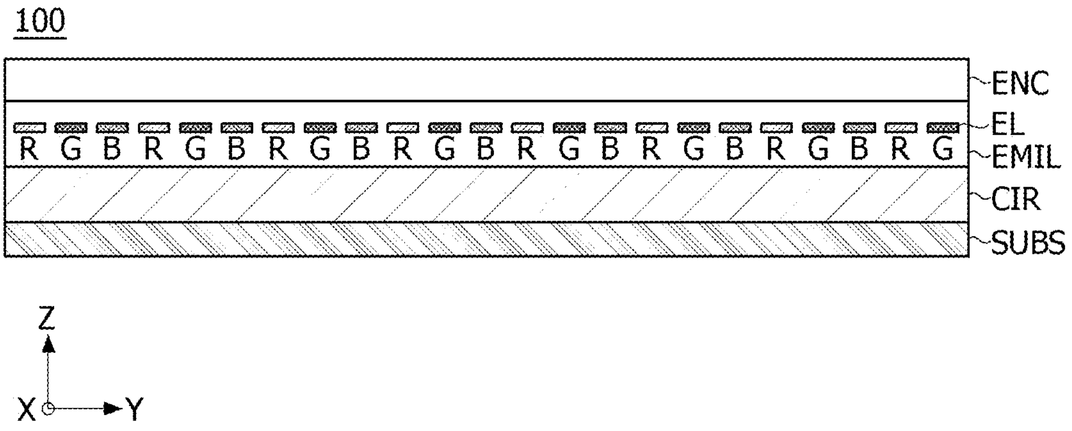
FIG. 2 is a cross-sectional view illustrating a cross-sectional structure of a display panel shown in FIG. 1 according to an embodiment of the present disclosure.

FIG. 1 is a block diagram illustrating a display device according to an embodiment of the present disclosure, and FIG. 2 is a cross-sectional view illustrating a cross-sectional structure of the display panel shown in FIG. 1 according to an embodiment of the present disclosure.

Referring to FIGS. 1 and 2, a display device according to an embodiment of the present disclosure includes a display panel 100, a display panel driving unit configured to write pixel data to pixels of the display panel 100, and a power supply unit 140 configured to generate power required for driving the pixels and the display panel driving unit.

The display panel 100 includes a pixel array AA that displays an input image. The pixel array AA includes a plurality of data lines 102, a plurality of gate lines 103 intersected with the data lines 102, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. Sub-pixels arranged in a column direction Y along a data line direction share the same data line 102. One horizontal period 1H is a time obtained by dividing one frame period by the total number of pixel lines L1 to Ln.

Touch sensors can be disposed on the display panel 100. A touch input can be sensed using separate touch sensors or can be sensed through pixels. The touch sensors can be disposed as an on-cell type or an add-on type on the screen of the display panel or implemented as in-cell type touch sensors embedded in the pixel array AA.

The display panel 100 can be implemented as a flexible display panel. The flexible display panel can be made of a plastic OLED panel. An organic thin film can be disposed on a back plate of the plastic OLED panel, and the pixel array AA can be formed on the organic thin film.

The back plate of the plastic OLED can be a polyethylene terephthalate (PET) substrate. The organic thin film is formed on the back plate. The pixel array AA and a touch sensor array can be formed on the organic thin film. The back plate blocks moisture permeation so that the pixel array AA is not exposed to humidity. The organic thin film can be a thin Polyimide (PI) film substrate. A multi-layered buffer film can be formed of an insulating material on the organic thin film. Lines can be formed on the organic thin film to supply power or signals applied to the pixel array AA and the touch sensor array.

To implement color, each of the pixels can be divided into a red sub-pixel (hereinafter referred to as "R sub-pixel"), a green sub-pixel (hereinafter referred to as "G sub-pixel"), and a blue sub-pixel (hereinafter referred to as "B sub-pixel"), but embodiments are not limited thereto. For example, each of the pixels can further include a white sub-pixel. Each of the sub-pixels 101 includes a pixel circuit. The pixel circuit is connected to the data line 102 and the gate line 103.

The cross-sectional structure of the display panel 100 can include a circuit layer CIR, a light-emitting element layer EMIL, and an encapsulation layer ENC stacked on a substrate SUBS, as shown in FIG. 2.

The circuit layer CIR can include a thin-film transistor (TFT) array including a pixel circuit connected to wirings such as a data line, a gate line, a power line, and the like, and a gate driver 410 and 420. The circuit layer CIR includes a plurality of metal layers insulated with insulating layers interposed therebetween, and a semiconductor material layer. All transistors formed in the circuit layer CIR can be implemented as n-channel oxide TFTs.

The light-emitting element layer EMIL can include a light-emitting element driven by the pixel circuit. The light-emitting element can include a light-emitting element of a red sub-pixel, a light-emitting element of a green sub-pixel, and a light-emitting element of a blue sub-pixel. The light-emitting element layer EMIL can further include a light-emitting element of a white sub-pixel. The light-emitting element layer EMIL corresponding to each of the sub-pixels can have a structure in which a light-emitting element and a color filter are stacked. The light-emitting elements EL in the light-emitting element layer EMIL can be covered by multiple protective layers including an organic film and an inorganic film.

The encapsulation layer ENC covers the light-emitting element layer EMIL to seal the circuit layer CIR and the light-emitting element layer EMIL. The encapsulation layer ENC can also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL can be effectively blocked.

A touch sensor layer can be formed on the encapsulation layer ENC, and a polarizing plate or a color filter layer can be disposed thereon. The touch sensor layer can include capacitive touch sensors that sense a touch input based on a change in capacitance before and after the touch input. The touch sensor layer can have metal wiring patterns and insulating films that form the capacitance of the touch sensors. The insulating films can insulate an area where the metal wiring patterns intersect and can planarize the surface of the touch sensor layer. The polarizing plate can improve visibility and contrast ratio by converting the polarization of external light reflected by metal in the touch sensor layer and the circuit layer. The polarizing plate can be implemented as a circular polarizing plate or a polarizing plate in which a linear polarizing plate and a phase retardation film are bonded together. A cover glass can be adhered to the polarizing plate. The color filter layer can include red, green, and blue color filters. The color filter layer can further include a black matrix pattern. The color filter layer can replace the polarizing plate by absorbing a part of the wavelength of light reflected from the circuit layer and the touch sensor layer, and increase the color purity of an image reproduced in the pixel array.

The power supply unit 140 generates direct current (DC) power to drive the display panel driving unit and the pixel array of the display panel 100 by using a DC-DC converter. The DC-DC converter can include a charge pump, a regulator, a buck converter, a boost converter, and the like. The power supply unit 140 can adjust a level of an input DC voltage applied from a host system to generate constant voltages (or DC voltages) such as a gamma reference voltage VGMA, gate-on voltages VGH and VEH, gate-off voltages VGL and VEL, the pixel driving voltage EVDD, the low-potential power voltage EVSS, the initialization voltage VINIT, and the reference voltage VREF. The gamma reference voltage VGMA is supplied to a data driver 110. The gate-on voltages VGH and VEH and the gate-off voltages VGL and VEL are supplied to a gate driver 120. The constant voltages such as the pixel driving voltage EVDD, the low-potential power voltage EVSS, the initialization voltage VINIT, and the reference voltage VREF can be supplied to the pixels 101 through the power lines commonly connected to the pixels 101.

The display panel driving unit writes pixel data of an input image to the pixels of the display panel 100 under control of a timing controller (TCON) 130.

The display panel driving unit includes the data driver 110 and the gate driver 120.

A de-multiplexer (DEMUX) can be disposed between the data driver 110 and the data lines 102. The de-multiplexer is omitted from FIG. 1. The de-multiplexer sequentially connects one channel of the data driver 110 to the plurality of data lines 102 and distributes in a time division manner the data voltage outputted from one channel of the data driver 110 to the data lines 102, thereby reducing the number of channels of the data driver 110.

The display panel driving circuit can further include a touch sensor driver for driving the touch sensors. The touch sensor driver is omitted from FIG. 1. In a mobile device, the timing controller 130, the power supply unit 140, the data driver 110, and the like can be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer in each of the channels of the data driver 110.

In the data driver 110, the output buffer included in one channel can be connected to adjacent data lines 102 through a de-multiplexer array. The de-multiplexer array can be formed directly on the substrate of the display panel 100 or integrated into one drive IC together with the data driver 110.

The gate driver 120 can be implemented as a gate in panel (GIP) circuit formed directly on a bezel BZ area of the display panel 100 together with the TFT array of the pixel array AA. The gate driver 120 sequentially outputs gate signals to the gate lines 103 under the control of the timing controller 130. The gate driver 120 can sequentially supply the gate signals to the gate lines 103 by shifting the gate signals using a shift register.

The timing controller 130 receives, from a host system, digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync can be omitted. The data enable signal DE has a cycle of one horizontal period (1H).

The timing controller 130 multiplies an input frame frequency by i and controls the operation timing of the display panel driving circuit with a frame frequency of the input frame frequency×i (where i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array, and a gate timing control signal for controlling the operation timing of the gate driver 120.

The voltage level of the gate timing control signal outputted from the timing controller 130 can be converted into the gate-on voltages VGH and VEH and the gate-off voltages VGL and VEL through a level shifter and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing signal includes the start pulse and the shift clock.

The host system can include a main board of one of a television system, a set-top box, a navigation system, a personal computer (PC), a home theater system, a vehicle system, and a mobile device system. In this situation, the data driver 110, the gate driver 120, the timing controller 130, and the like can be integrated into one drive IC (DIC) in mobile devices or wearable devices.

Figure 3:
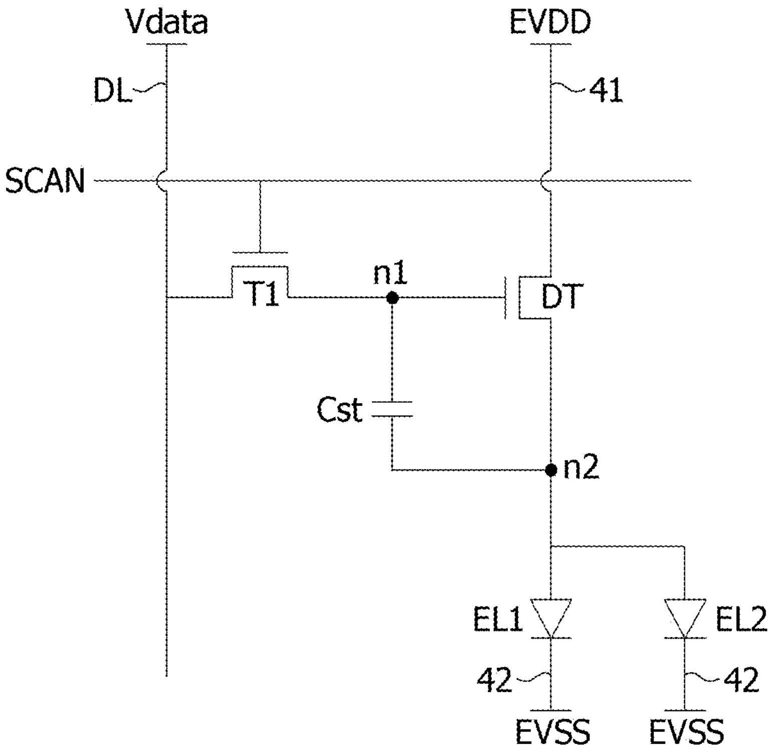
FIG. 3 is a diagram illustrating a pixel circuit according to an embodiment of the present disclosure.
Figure 4:
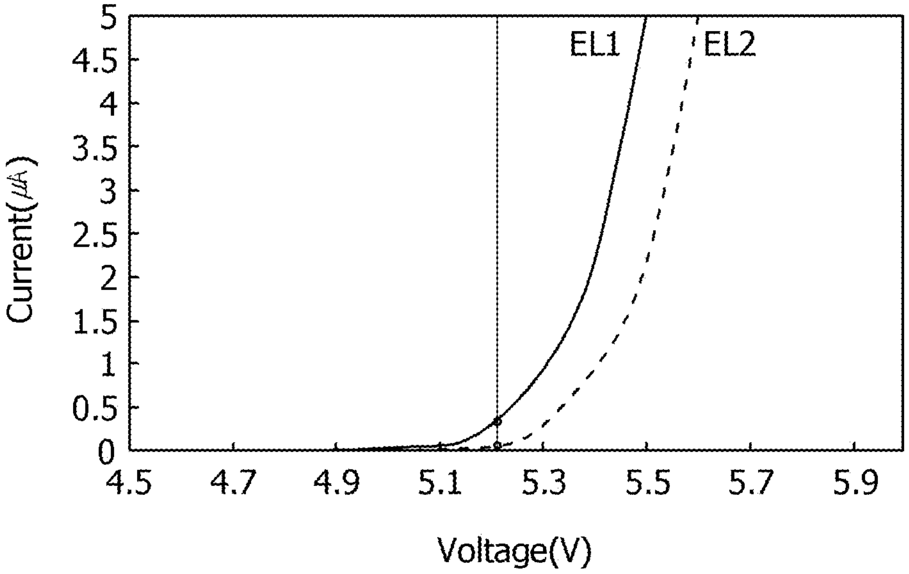
FIG. 4 is a diagram illustrating operation voltages of first and second light-emitting elements shown in FIG. 3 according to an embodiment of the present disclosure.

FIG. 3 is a diagram illustrating a pixel circuit according to a first embodiment of the present disclosure, and FIG. 4 is a diagram illustrating operation voltages of first and second light-emitting elements shown in FIG. 3.

Referring to FIG. 3, the pixel circuit according to a first embodiment of the present disclosure includes a first light-emitting element EL1, a second light-emitting element EL2, a driving element DT for supplying a current to the first and second light-emitting elements EL1 and EL2, a switch element T1 for applying a data voltage Vdata to a gate electrode of the driving element DT, and a capacitor Cst for storing a gate-source voltage Vgs of the driving element DT. The driving element DT and the switch element T1 can be implemented as N-channel TFTs, but are not limited thereto.

The first and second light-emitting elements EL1 and EL2 emit light by a current applied through the channel of the driving element DT based on the gate-source voltage Vgs of the driving element DT that varies with the data voltage Vdata. The first and second light-emitting elements EL1 and EL2 can be implemented as OLEDs including an organic compound layer formed between the anode and the cathode. The organic compound layer can include a hole injection layer HIL, a hole transport layer HTL, a light-emitting layer EML, an electron transport layer ETL, an electron injection layer EIL, and the like, but is not limited thereto. The anodes of the first and second light-emitting elements EL1 and EL2 are connected to the driving element DT through a second node n2, and the cathodes of the first and second light-emitting elements EL1 and EL2 are connected to a low potential power voltage line or a second power line 42 through which a low potential power voltage EVSS is applied. For example, a first anode of the first and a second anode of the second light-emitting elements EL1 and EL2 are connected in common to the driving element DT through a second node n2.

The first and second light-emitting elements EL1 and EL2 are connected in parallel between the second node n2 and the second power line 42.

The first and second light-emitting elements EL1 and EL2 can have different threshold voltages Vth. For example, the threshold voltage Vth of the first light-emitting element is lower than the threshold voltage Vth of the second light-emitting element EL2. Therefore, as shown in FIG. 4, for example, in a low voltage region below 5.2V, the first light-emitting element EL1 emits light, and in a high voltage region above 5.2V, both the first and second light-emitting elements EL1 and EL2 emit light. In other words, in response to a low voltage, the first light-emitting element EL1 can turn on and emit light while the second light-emitting element EL2 remains off, and then in response to a high voltage, the first light-emitting element EL1 and the second light-emitting element EL2 can both be turned on and simultaneously emit light together. The threshold voltages of the first and second light-emitting elements EL1 and EL2 can be varied by configuring different stack structures including the hole transport layer HTL, a hole blocking layer HBL, the electron transport layer ETL, and an electron blocking layer EBL shown in FIGS. 12 to 14 to be described below, by changing the doping concentration of the light-emitting layer EML, e.g., the concentration of p-doping, n-doping, EML dopant, or the like, or by changing the material, ratio, or the like of the light-emitting layer EML. In other words, the properties of the first and second light-emitting elements EL1 and EL2 can be set different so that the first and second light-emitting elements EL1 and EL2 have different threshold voltages and turn on according to different voltage conditions.

The driving element DT supplies a current to the first and second light-emitting elements EL1 and EL2 based on the gate-source voltage Vgs, thereby driving the first and second light-emitting elements EL1 and EL2. The driving element DT includes the gate electrode connected to a first node n1, a first electrode (or drain) connected to a pixel driving voltage line 41 through which a pixel driving voltage EVDD is applied, and a second electrode (or source) connected to the second node n2.

The switch element T1 is turned on in response to a gate-on voltage of a gate signal SCAN to apply the data voltage Vdata to the first node n1 through a data line DL. The switch element T1 includes a gate electrode to which the gate signal SCAN is applied, a first electrode connected to the data line DL, and a second electrode connected to the first node n1.

The capacitor Cst can be connected between the first node n1 and the second node n2. The capacitor Cst can charge the gate-source voltage Vgs of the driving element DT.

Figure 5:
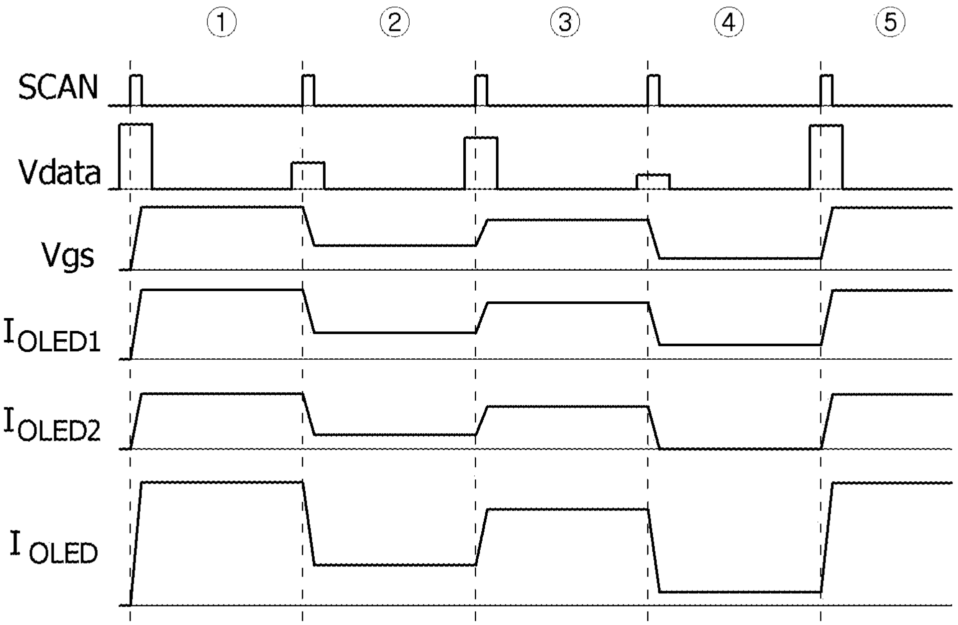
FIGS. 5 to 6 are diagrams illustrating an operation principle of the pixel circuit shown in FIG. 3 according to an embodiment of the present disclosure.
Figure 6:
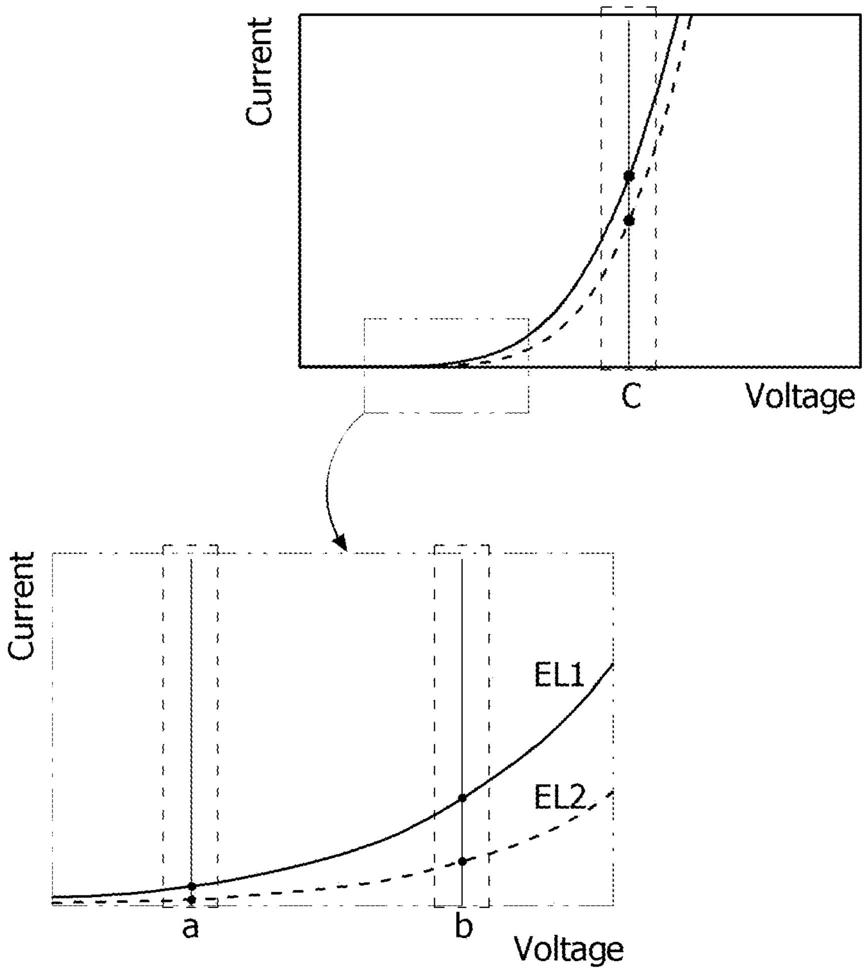

FIGS. 5 to 6 are diagrams illustrating an operation principle of the pixel circuit shown in FIG. 3 according to an embodiment of the present disclosure.

Referring to FIGS. 3, 5, and 6, currents $I_{OLED1}$ and $I_{OLED2}$ flowing through the first light-emitting element EL1 and the second light-emitting element EL2 can vary depending on the voltage level of the data voltage Vdata.

In segment ④, when a data voltage of a low grayscale is applied, no current flows through the second light-emitting element EL2 (e.g., EL2 can be reserved for when a bright image is needed to be displayed). That is, as shown in FIG. 6, when a voltage at point "a" is applied, the first light-emitting element having a relatively low threshold voltage emits light, but the second light-emitting element does not emit light (e.g., when displaying a dim or dark image).

In segment ②, when a data voltage higher than that in segment ④ is applied, a current flows through the first light-emitting element and the second light-emitting element. That is, as shown in FIG. 6, when a voltage at point "b" is applied, both the first light-emitting element and the second light-emitting element emit light (e.g., when displaying a bright image).

In the remaining segments ①, ③, and ⑤, when a high grayscale data voltage higher than that in segment ② is applied, a current flows through the first light-emitting element and the second light-emitting element. That is, as shown in FIG. 6, when a voltage at point "c" is applied, both the first light-emitting element and the second light-emitting element emit light. In this way, a finer granularity of control can be provided which can produce better color quality for both low grayscale data and high grayscale data.

Figure 7:
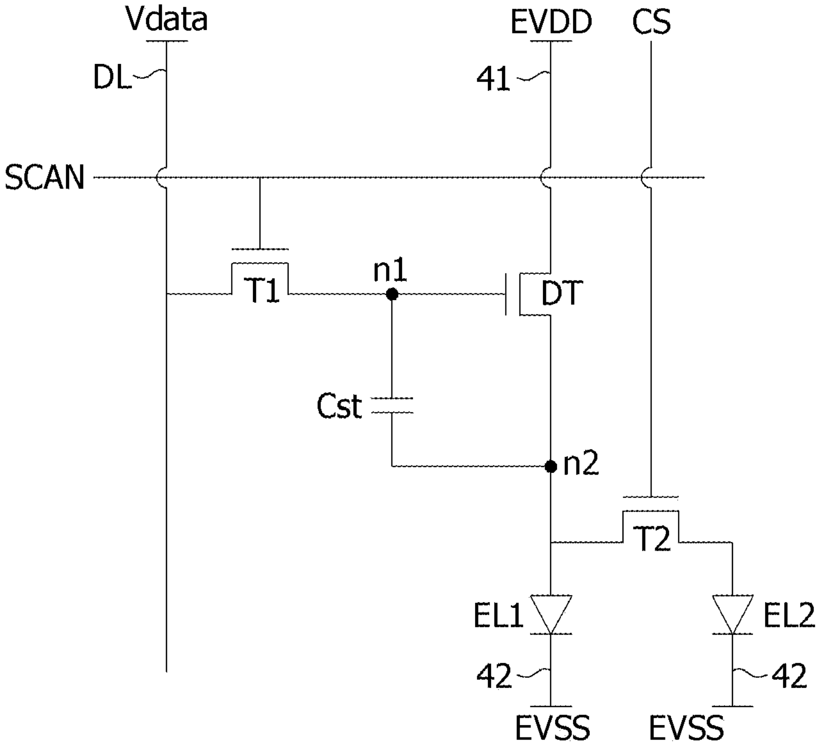
FIG. 7 is a diagram illustrating a pixel circuit according to another embodiment of the present disclosure.

FIG. 7 is a diagram illustrating a pixel circuit according to a second embodiment of the present disclosure. The pixel circuit in FIG. 7 is the same as the pixel circuit in FIG. 3, except that a second switching element T2 is connected between the first light-emitting element EL1 and the second light-emitting element EL2 (e.g., rather than a direct wire connection as in FIG. 3). In this way, the first light-emitting element EL1 and the second light-emitting element EL2 can be individually controlled without having to depend on specifically defined threshold voltages.

Referring to FIG. 7, the pixel circuit according to a second embodiment of the present disclosure includes the first light-emitting element EL1, the second light-emitting element EL2, the driving element DT for supplying a current to the first and second light-emitting elements EL1 and EL2, a first switch element T1 for applying the data voltage Vdata to the gate electrode of the driving element DT, a second switch element T2 for supplying or blocking a current to the second light-emitting element EL2, and the capacitor Cst for storing the gate-source voltage Vgs of the driving element DT. The driving element DT and the first and second switch elements T1 and T2 can be implemented as N-channel TFTs, but are not limited thereto.

The first and second light-emitting elements EL1 and EL2 emit light by a current applied through the channel of the driving element DT based on the gate-source voltage Vgs of the driving element DT that varies with the data voltage Vdata.

The first and second light-emitting elements EL1 and EL2 are connected in parallel between the second node n2 and the second power line 42.

The driving element DT supplies a current to the first and second light-emitting elements EL1 and EL2 based on the gate-source voltage Vgs, thereby driving the first and second light-emitting elements EL1 and EL2. The driving element DT includes the gate electrode connected to the first node n1, the first electrode (or drain) connected to the pixel driving voltage line 41 through which the pixel driving voltage EVDD is applied, and the second electrode (or source) connected to the second node n2.

The first switch element T1 is turned on in response to the gate-on voltage of the gate signal SCAN to apply the data voltage Vdata to the first node n1 through the data line DL. The switch element T1 includes the gate electrode to which the gate signal SCAN is applied, the first electrode connected to the data line DL, and the second electrode connected to the first node n1.

As discussed above, a second switching element T2 can be connected between the first light-emitting element EL1 and the second light-emitting element EL2 for connecting or isolating the second switching element T2 from the driving element DT (e.g., driving TFT). The second switching element T2 is turned on in response to the gate-on voltage of a control signal CS to connect the second light-emitting element EL2 to the second node n2, thereby transmitting a current to the second light-emitting element EL2. The second switch element T2 includes a gate electrode to which the control signal CS is applied, a first electrode connected to the second node n2, and a second electrode connected to the anode electrode of the second light-emitting element EL2.

The control signal CS can be applied from the timing controller. For example, the timing controller can apply the control signal according to, for example, the luminance of the entire area in which the image is displayed or the luminance of each of a plurality of separated areas by analyzing the image data.

The capacitor Cst can be connected between the first node n1 and the second node n2. The capacitor Cst can charge the gate-source voltage Vgs of the driving element DT.

FIGS. 8 to 11 are diagrams illustrating an operation principle of the pixel circuit shown in FIG. 7.

Figure 8:
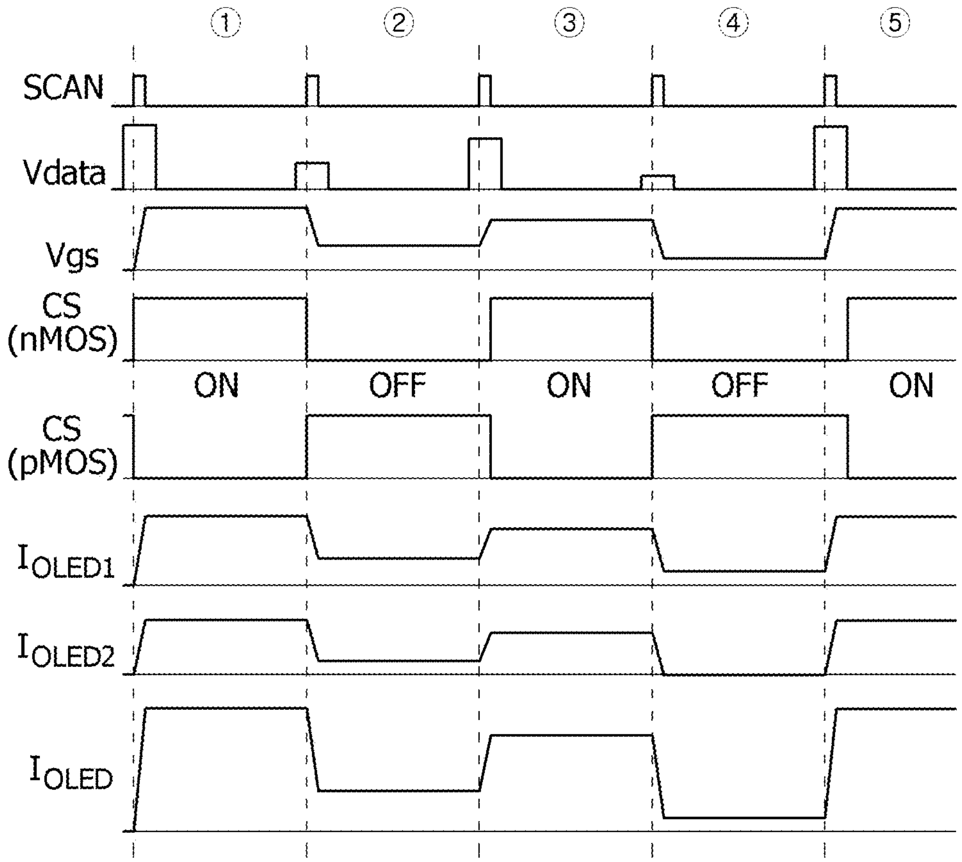
FIGS. 8 to 11 are diagrams illustrating an operation principle of the pixel circuit shown in FIG. 7 according to an embodiment of the present disclosure.

Referring to FIGS. 7 and 8, when the data voltage Vdata is applied, if the second switch element T2 is turned on by the gate-on voltage of the control signal CS, both the first and second light-emitting elements EL1 and EL2 emit light. On the other hand, when the data voltage Vdata is applied, if the second switch element T2 is turned off by the gate-off voltage of the control signal CS, then the first light-emitting element EL1 emits light while the second light-emitting element EL2 does not emit light (e.g., if T2 is OFF, then EL2 can be OFF, and if T2 is ON, then both EL1 and EL2 can be ON).

In the first embodiment, whether the second light-emitting element emits light is determined by the voltage level of the data voltage (e.g., based on the different voltage thresholds of EL1 and EL2), whereas in the second embodiment, whether the second light-emitting element emits light is determined by the on/off state of the second switch element T2 regardless of the voltage level of the data voltage (e.g., voltage thresholds of EL1 and EL2 can be freely set and more design freedom can be provided).

Figure 9:
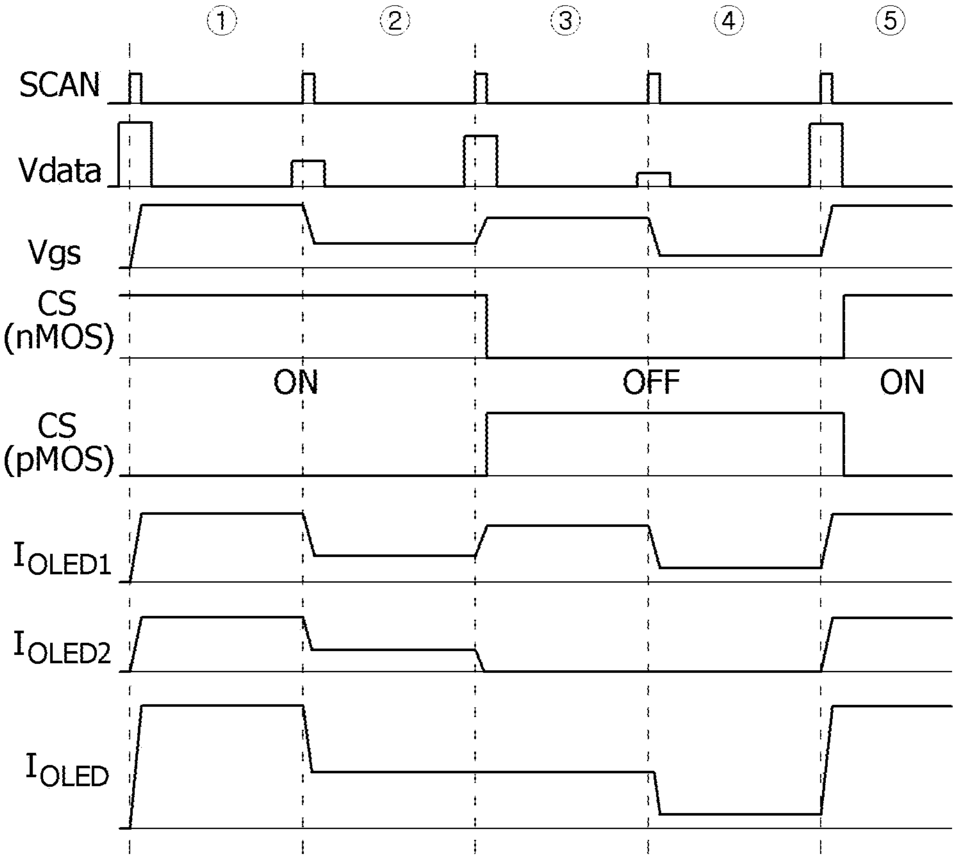

Referring to FIGS. 7 and 9, since it is possible to adjust the segment in which the gate-on voltage of the control signal CS is applied or the segment in which the gate-off voltage of the control signal CS is applied, it is possible to adjust the time in which the second light-emitting element EL2 emits light or does not emit light.

Accordingly, in the second embodiment, the second switch elements of all pixels can be turned on or off in consideration of an average luminance of the image displayed on the screen, and a finer granularity of luminance control can be provided.

Figure 10:
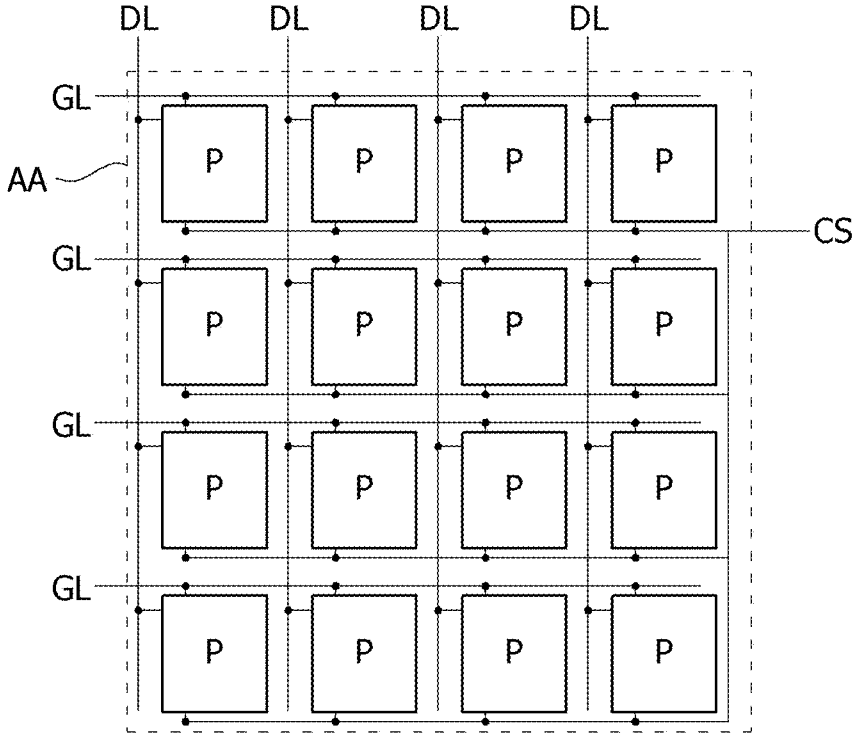

For example, as shown in FIG. 10, the control signal CS is applied to all pixels in the entire area AA to cause the second light-emitting elements of all pixels not to emit light when the average luminance is low and to cause the second light-emitting elements to emit light when the average luminance is high.

In addition, in the second embodiment, the screen can be divided into a plurality of areas, and the average luminance of the image displayed in each area can be checked, and in consideration of the checked average luminance, the second switch elements of the pixels within a corresponding area can be turned on or off on an area by area basis.

Figure 11:
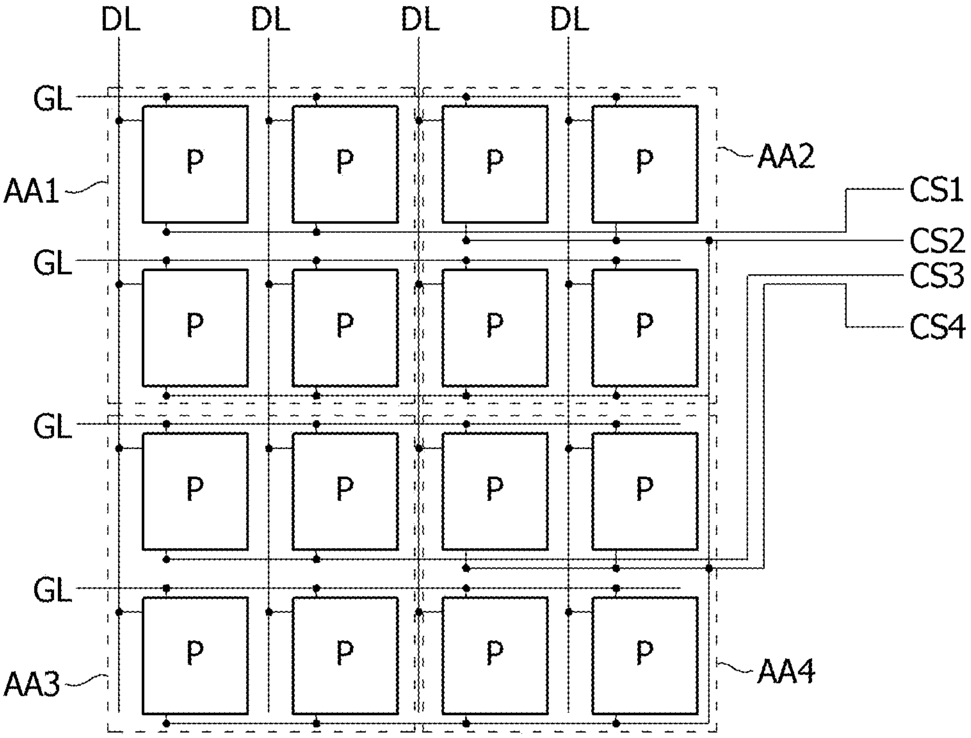

In another example, as shown in FIG. 11, control signals CS1, CS2, CS3, and CS4 are applied to the pixels for each area AA1, AA2, AA3, AA4 to cause the second light-emitting element of the pixels in the area with low average luminance not to emit light and to cause the second light-emitting elements of the pixels in the area with high average luminance to emit light, which can provide better luminance control and improve image quality.

As described above, in the second embodiment, since one switch element is added to control the driving of two light-emitting elements, it can be free to determine whether or not to operate the pixel.

Figure 12:
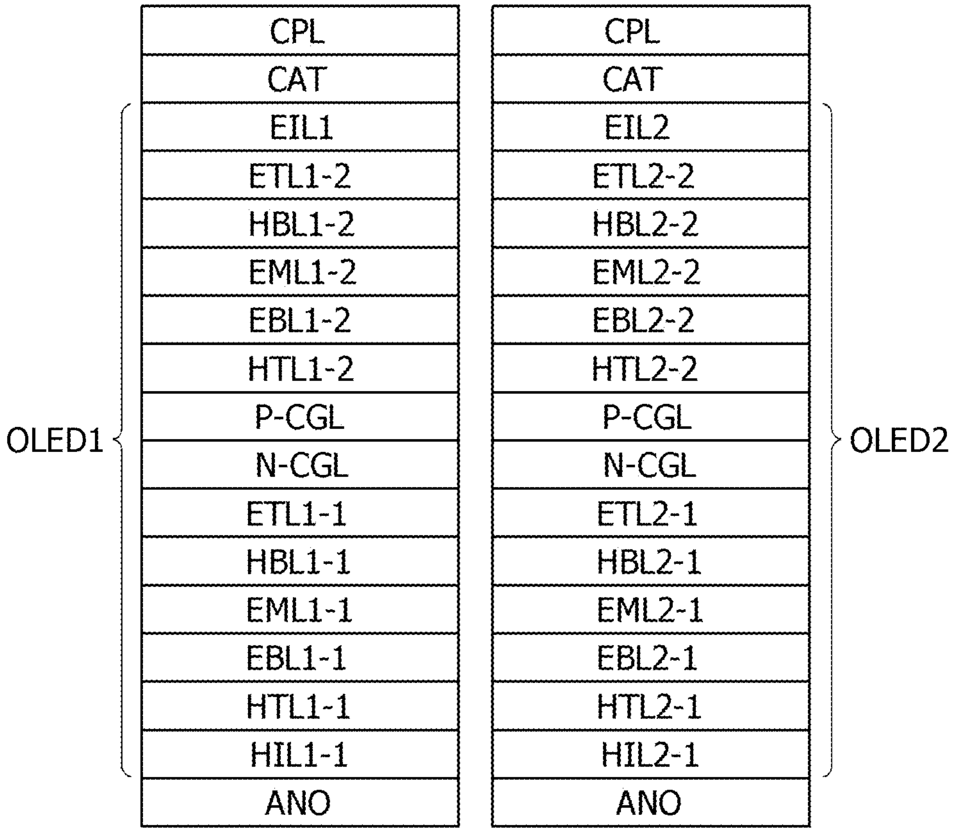
FIGS. 12 to 14 are diagrams illustrating an OLED structure used as a light-emitting element according to an embodiment of the present disclosure.
Figure 13:
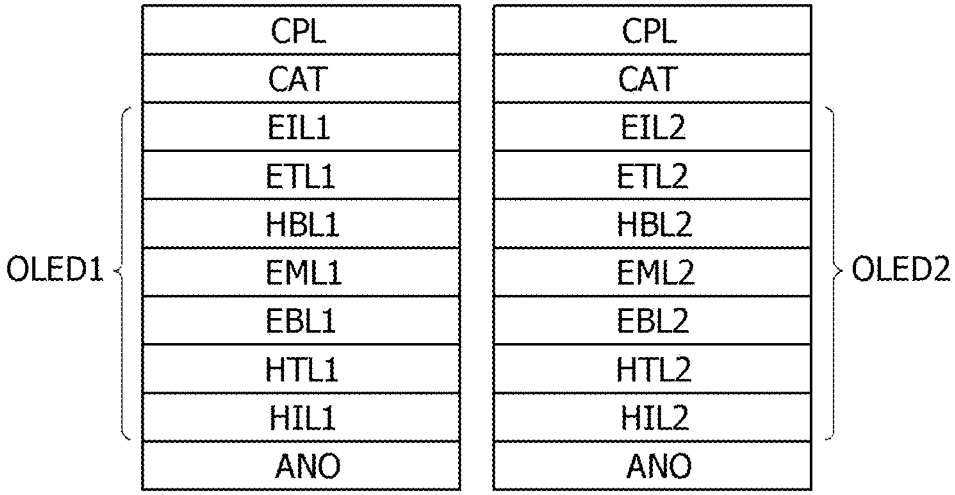
Figure 14:
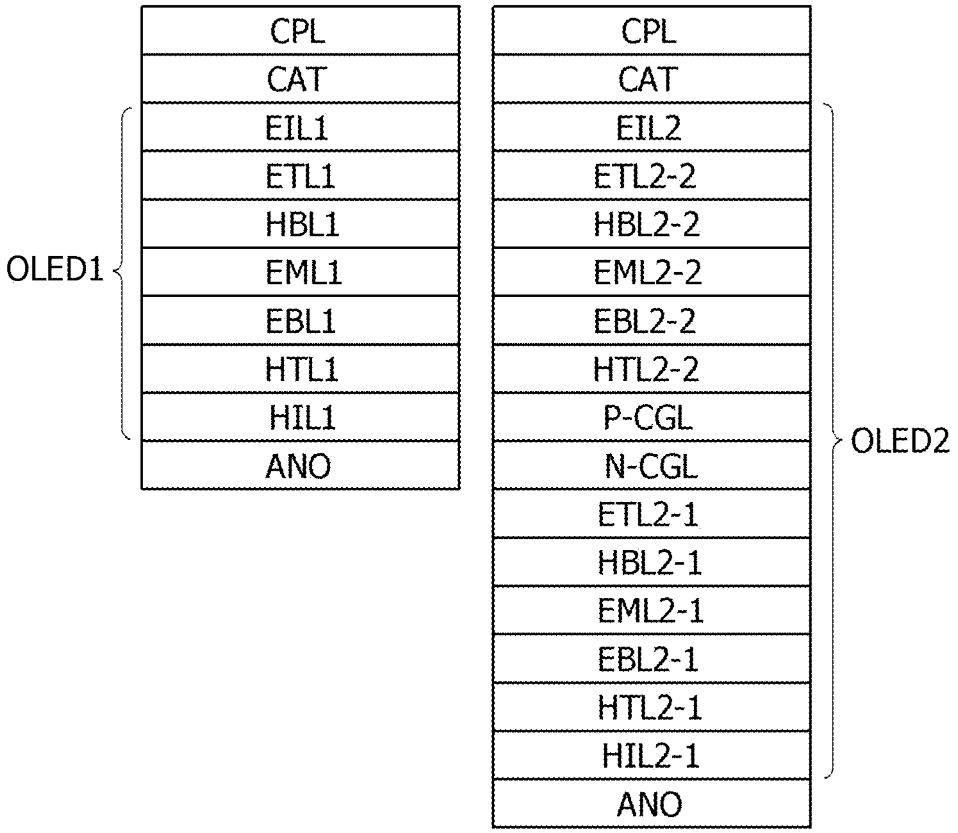

FIGS. 12 to 14 are diagrams illustrating an OLED structure used as a light-emitting element.

Referring to FIG. 12, each of the light-emitting element layers used as the first and second light-emitting elements EL1 and EL2 according to an embodiment can have a tandem stack structure in which a plurality of light-emitting layers are stacked. The OLED with a tandem stack structure can improve the luminance and lifespan of the sub-pixel.

Each of the light-emitting element layers can include an anode electrode ANO, an organic light-emitting layer OLED1 and OLED2, a cathode electrode CAT, and a capping layer CPL. The capping layer CPL can be a functional layer added for various functions.

A first organic light-emitting layer OLED1 used as the first light-emitting element EL1 can include a first-first hole injection layer HIL1-1, a first-first hole transport layer HTL1-1, a first-first electron blocking layer EBL1-1, a first-first light-emitting layer EML1-1, a first-first hole blocking layer HBL1-1, a first-first electron transport layer ETL1-1, an N-type charge generation layer N-CGL, a P-type charge generation layer P-CGL, a first-second hole transport layer HTL1-2, a first-second electron blocking layer EBL1-2, a first-second light-emitting layer EML1-2, a first-second hole blocking layer HBL1-2, a first-second electron transport layer ETL1-2, and a first electron injection layer EIL 1.

A second organic light-emitting layer OLED2 used as the second light-emitting element EL2 can include a second-first hole injection layer HIL2-1, a second-first hole transport layer HTL2-1, a second-first electron blocking layer EBL2-1, a second-first light-emitting layer EML2-1, a second-first hole blocking layer HBL2-1, a second-first electron transport layer ETL2-1, an N-type charge generation layer N-CGL, a P-type charge generation layer P-CGL, a second-second hole transport layer HTL2-2, a second-second electron blocking layer EBL2-2, a second-second light-emitting layer EML2-2, a second-second hole blocking layer HBL2-2, a second-second electron transport layer ETL2-2, and a second electron injection layer EIL2.

The hole transport layer HTL is an organic layer that transfers holes from the anode electrode to the light-emitting layer EML. The electron transport layer ETL is a layer that transfers electrons from the cathode electrode to the light-emitting layer EML. In the light-emitting layer EML, holes supplied through the anode electrode and electrons supplied through the cathode electrode are recombined to generate excitons. The electron blocking layer EBL is a layer that prevents electrons injected into the light-emitting layer EML from transferring to the hole transport layer HTL. The hole blocking layer HBL is a layer that prevents holes injected into the light-emitting layer EML from transferring to the electron transport layer ETL.

Referring to FIG. 13, each of the OLEDs used as the first and second light-emitting elements EL1 and EL2 according to an embodiment can have a single stack structure.

Each of the light-emitting element layers can include the anode electrode ANO, the organic light-emitting layer OLED, the cathode electrode CAT, and the capping layer CPL.

The first organic light-emitting layer OLED1 used as the first light-emitting element EL1 can include a first hole injection layer HIL1, a first hole transport layer HTL1, a first electron blocking layer EBL1, a first light-emitting layer EML 1, a first hole blocking layer HBL1, a first electron transport layer ETL1, and a first electron injection layer EIL1.

The second organic light-emitting layer OLED2 used as the second light-emitting element EL2 can include a second hole injection layer HIL2, a second hole transport layer HTL2, a second electron blocking layer EBL2, a second light-emitting layer EML2, a second hole blocking layer HBL2, a second electron transport layer ETL2, and a second electron injection layer EIL2. For example, in FIGS. 13 and 14, the first and second light-emitting elements EL1 and EL2 can have the same type of stacked structure.

Referring to FIG. 14, the light-emitting element layers used as the first and second light-emitting elements EL1 and EL2 according to an embodiment can have a single stack structure and a tandem stack structure, respectively. In other words, the first and second light-emitting elements EL1 and EL2 can have different stacked structures (e.g., a mixed arrangement).

The first organic light-emitting layer OLED1 used as the first light-emitting element EL1 can include the first hole injection layer HIL1, the first hole transport layer HTL1, the first electron blocking layer EBL1, the first light-emitting layer EML1, the first hole blocking layer HBL1, the first electron transport layer ETL1, and the first electron injection layer EIL1.

The second organic light-emitting layer OLED2 used as the second light-emitting element EL2 can include the second-first hole injection layer HIL2-1, the second-first hole transport layer HTL2-1, the second-first electron blocking layer EBL2-1, the second-first light-emitting layer EML2-1, the second-first hole blocking layer HBL2-1, the second-first electron transport layer ETL2-1, the N-type charge generation layer N-CGL, the P-type charge generation layer P-CGL, the second-second hole transport layer HTL2-2, the second-second electron blocking layer EBL2-2, the second-second light-emitting layer EML2-2, the second-second hole blocking layer HBL2-2, the second-second electron transport layer ETL2-2, and the second electron injection layer EIL2.

As described above, in the second embodiment, two identical light-emitting elements are formed adjacent to each other, but the anode electrodes are separated by a switch, so that a phenomenon of emitting light due to a leakage current can be reduced.

In the second embodiment, the anode electrodes of the light-emitting elements composed of the same fine metal mask (FMM) are separated by a switch, so that it can be possible to design freely from FMM alignment problem.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit comprising:
- a driving element including a first electrode connected to a first power line, a gate electrode connected to a first node, and a second electrode connected to a second node;
- a switch element configured to supply a data voltage to the first node in response to a gate signal;
- a capacitor connected between the first node and the second node; and
- a first light-emitting element and a second light-emitting element connected in parallel between the second node and a second power line,
- wherein the first light-emitting element and the second light-emitting element are configured to emit a same color of light,
- wherein a first threshold voltage of the first light-emitting element is smaller than a second threshold voltage of the second light-emitting element, based on the first light-emitting element having a different stack structure than the second light-emitting element or an organic light-emitting layer in the first light-emitting element having different composition materials than an organic light-emitting layer in the second light-emitting element, and
- wherein the driving element is configured to supply a driving current to only the first light-emitting element at a first voltage level of the data voltage, and supply the driving current to both the first light-emitting element and the second light-emitting element at a second voltage level of the data voltage higher than the first voltage level.

2. The pixel circuit of claim 1, wherein the switch element includes:
- a gate electrode connected to a gate line configured to receive the gate signal, a first electrode connected to a data line configured to receive the data voltage, and a second electrode connected to the first node.

3. A display device comprising:
- a display panel including a plurality of data lines, a plurality of gate lines intersecting the plurality of data lines, and a plurality of pixel circuits,
- wherein each of the plurality of pixel circuits includes:
  - a driving element including a first electrode connected to a first power line, a gate electrode connected to a first node, and a second electrode connected to a second node;
  - a switch element configured to supply a data voltage to the first node in response to a gate signal;
  - a capacitor connected between the first node and the second node; and
  - a first light-emitting element and a second light-emitting element connected in parallel between the second node and a second power line,
- wherein the first light-emitting element and the second light-emitting element are configured to emit a same color of light,
- wherein a first threshold voltage of the first light-emitting element is smaller than a second threshold voltage of the second light-emitting element, based on the first light-emitting element having a different stack structure than the second light-emitting element or an organic light-emitting layer in the first light-emitting element having different composition materials than an organic light-emitting layer in the second light-emitting element, and wherein the driving element is configured to supply a driving current to only the first light-emitting element at a first voltage level of the data voltage, and supply the driving current to both the first light-emitting element and the second light-emitting element at a second voltage level of the data voltage higher than the first voltage level.

4. The display device of claim 3, wherein the switch element includes:

a gate electrode connected to a gate line configured to receive the gate signal, a first electrode connected to a data line configured to receive the data voltage, and a second electrode connected to the first node.

* * * * *